United States Patent
Cheng et al.

(10) Patent No.: US 7,739,347 B2
(45) Date of Patent: *Jun. 15, 2010

(54) SYSTEM, PORTABLE ELECTRONIC APPARATUS AND METHOD FOR TIMELY RECEIVING AND DISPLAYING ELECTRONIC FILES

(75) Inventors: Hua-Dong Cheng, Guangdong (CN); Wen-Chuan Lian, Guangdong (CN); Kuan-Hong Hsieh, Guangdong (CN); Han-Che Wang, Guangdong (CN)

(73) Assignees: Hong Fu Jin Precision Industry (Shen Zhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 281 days.

This patent is subject to a terminal disclaimer.

(21) Appl. No.: 11/309,781

(22) Filed: Sep. 24, 2006

(65) Prior Publication Data

US 2007/0079175 A1      Apr. 5, 2007

(30) Foreign Application Priority Data

Sep. 30, 2005    (TW) ............................. 94134322 A

(51) Int. Cl.
    *G06F 11/00*    (2006.01)
(52) U.S. Cl. ................. 709/207; 709/206; 455/414.2
(58) Field of Classification Search ......... 709/206–207; 455/414.2
    See application file for complete search history.

(56) References Cited

U.S. PATENT DOCUMENTS

| | | | | |
|---|---|---|---|---|
| 6,237,027 | B1* | 5/2001 | Namekawa | 709/206 |
| 6,496,852 | B1 | 12/2002 | Yamaguchi | |
| 7,548,955 | B2* | 6/2009 | Nicholas, III | 709/206 |
| 2002/0007401 | A1* | 1/2002 | Suzuki | 709/207 |
| 2002/0087649 | A1* | 7/2002 | Horvitz | 709/207 |
| 2003/0026231 | A1* | 2/2003 | Lazaridis et al. | 370/338 |
| 2003/0069002 | A1* | 4/2003 | Hunter et al. | 455/404 |

FOREIGN PATENT DOCUMENTS

TW    M242778    9/2004

* cited by examiner

*Primary Examiner*—Wing F Chan
*Assistant Examiner*—Ruolei Zong
(74) *Attorney, Agent, or Firm*—Winston Hsu

(57) ABSTRACT

A portable electronic apparatus for timely receiving and displaying electronic files is provided. An identification code of the electronic file indicates that the electronic file is an instant file or a common file. A receiving unit (21) of the portable electronic apparatus is configured for receiving the electronic file, determining according to the identification code whether the electronic file is an instant file and determining whether the main part is in the "power-on" state via help of a power controlling unit (24) of the portable electronic apparatus; and sending an interrupting instruction to the main part if the electronic file is an instant file and the main part is in the "power-on" state. The main part receives the interrupt instruction, and obtains the electronic file to display according to the interrupt instruction.

5 Claims, 7 Drawing Sheets

SYSTEM, PORTABLE ELECTRONIC APPARATUS AND METHOD FOR TIMELY RECEIVING AND DISPLAYING ELECTRONIC FILES

FIELD OF THE INVENTION

The present invention relates generally to a system, portable electronic apparatus and method for timely receiving and displaying an electronic file to recipients.

DESCRIPTION OF RELATED ART

As computer becomes more and more important in people's daily life, people are getting accustomed to storing frequently used information in a computer digitally (i.e., electronic files). Traditionally, people used to use paper for information exchange and data transferring. Now, with the development of the network, a new way of information exchange and data transferring using network has replaced the traditional method. This new method allows important files to be transferred timely and correctly.

Currently, some portable electronic apparatuses can be used to transfer electronic files over a wireless network. The electronic files are sent to a portable electronic apparatus and stored by the portable electronic apparatus in a database connected therewith. Recipients then can obtain the electronic files if they access the database. Among those electronic files, some are important files, such as meeting notices. Those important files need to be displayed to the recipients instantly. If the recipients have not timely access the database, they will most likely miss those important files, and therefore to miss important things those important files indicate. Recently, some portable electronic apparatuses have been equipped with a function to display a prompt message to the recipients when a file is received. However, the prompt message is to be displayed only when the portable electronic apparatuses are in a "power-on" state. If the portable electronic apparatuses are in a "power-off" state, the recipients will as well miss those important files.

What is still needed is a system, portable electronic apparatus and method which can receive and display important electronic files to the recipient in time.

SUMMARY OF INVENTION

A system for timely receiving and displaying electronic files is provided. A preferred embodiment of the system is for receiving and displaying electronic files, including a data sending electronic device and a plurality of portable electronic apparatus. The data sending electronic device is for sending an electronic file with an identification code and the identification code indicating the electronic file is an instant file or a common file. The portable electronic apparatus electrically connects to the data sending electronic device. The portable electronic apparatus comprises a main part and a receiving unit. The main part is configured for displaying the electronic file and originally stays in either a "power-on" state or a "power-off" state. The receiving unit is configured for receiving the electronic file, determining according to the identification code whether the electronic file is an instant file and determining whether the main part is in the "power-on" state; and sending an interrupt instruction to the main part o display the electronic file if the electronic file is an instant file and the main part is in the "power-on" state.

A portable electronic apparatus for timely receiving and displaying electronic files with identification code is provided. The identification code indicates that the electronic file is an instant file or a common file. The portable electronic apparatus comprises a main part, a receiving unit, and a power controlling unit. The main part is configured for displaying the electronic file. The receiving unit that is in a normally "power-on" state is configured for receiving the electronic file installed with the identification code, and determining according to the identification code whether the electronic file is an instant file or a common file. The power controlling unit is electrically connected between the receiving unit and the main part, configured for detecting that the main part is in a "power-on" state or in a "power-off" state. Wherein the receiving unit is further configured for sending an interrupt instruction to the main part to display the electronic file if the receiving unit determines the electronic file is an instant file and the receiving unit is informed that the main part is in a "power-on" state.

A method for timely receiving and displaying electronic files is provided. A preferred embodiment of the method comprises: providing a portable electronic apparatus electrically connected to a data sending electronic device, the portable electronic apparatus comprising a receiving unit and a main part, and the main part being selective in a "power-on" state or a "power-off" state; receiving from the data sending electronic device an electronic file installed with an identification code which indicates whether the electronic file is an instant file or a common file; determining whether the electronic file is an instant file or a common file according to the identification code and whether the main part is in the "power-on" state or in the "power-off" state; and executing the following steps if the electronic file is an instant file and the main part is in the "power-on" state: sending an interrupt instruction to the main part; receiving the interrupt instruction with the main part; and obtaining the electronic file to display with the main part according to the interrupt instruction.

Other advantages and novel features will be drawn from the following detailed description of the preferred embodiment with reference to the attached drawings, in which:

DETAILED DESCRIPTION

Figure 1:
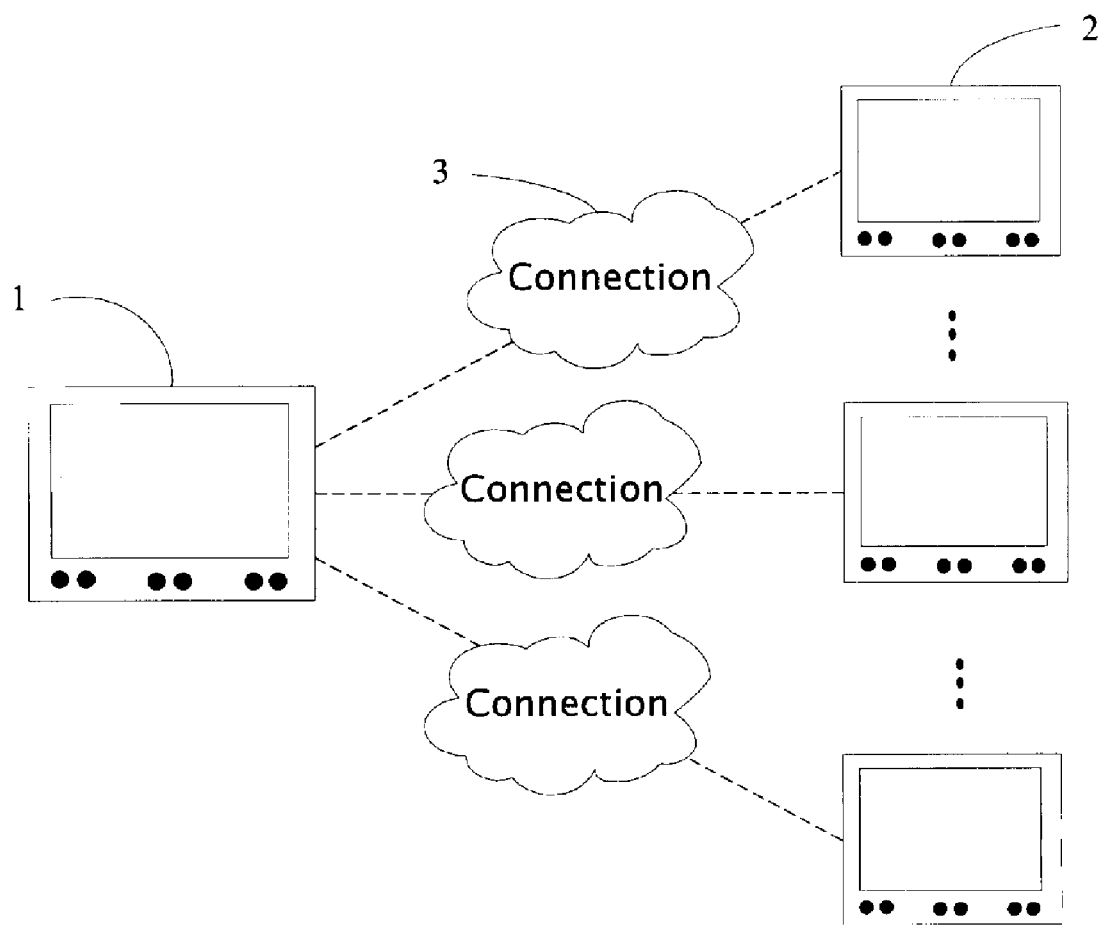
FIG. 1 is a schematic diagram of a system for timely receiving and displaying electronic files in accordance with a preferred embodiment of the present invention.

FIG. 1 is an exemplary hardware infrastructure diagram of a system for timely receiving and displaying electronic files (hereinafter "the system") of a preferred embodiment of the present invention. The system includes a data sending electronic device 1 electrically connected to a plurality of portable electronic apparatuses 2 via corresponding number of connections 3. The data sending electronic device 1 is installed for compressing an original electronic file (hereunder simplified as "electronic file") into a compressed electronic file and for sending the compressed electronic file to one or more of the portable electronic apparatuses 2. The portable electronic apparatus 2 is configured for receiving the compressed electronic file transmitted from the data sending electronic device 1 via the connection 3, decompressing the compressed electronic file to the electronic file and for displaying the electronic file to recipients. The connection 3 can be a wired connection or a wireless connection or any combination of networks.

In this embodiment, all electronic files received by the portable electronic apparatus 2 can be classified into two groups: instant files and common files. The instant files refer to important files, such as meeting notices that need to be displayed to recipients promptly. The common files refer to unimportant files, such as greeting messages that need not be displayed to the recipients promptly. Each of the electronic files is assigned an identification code by the data sending electronic device 1. The identification code indicates whether the electronic file is an instant file or a common file.

Figure 2:
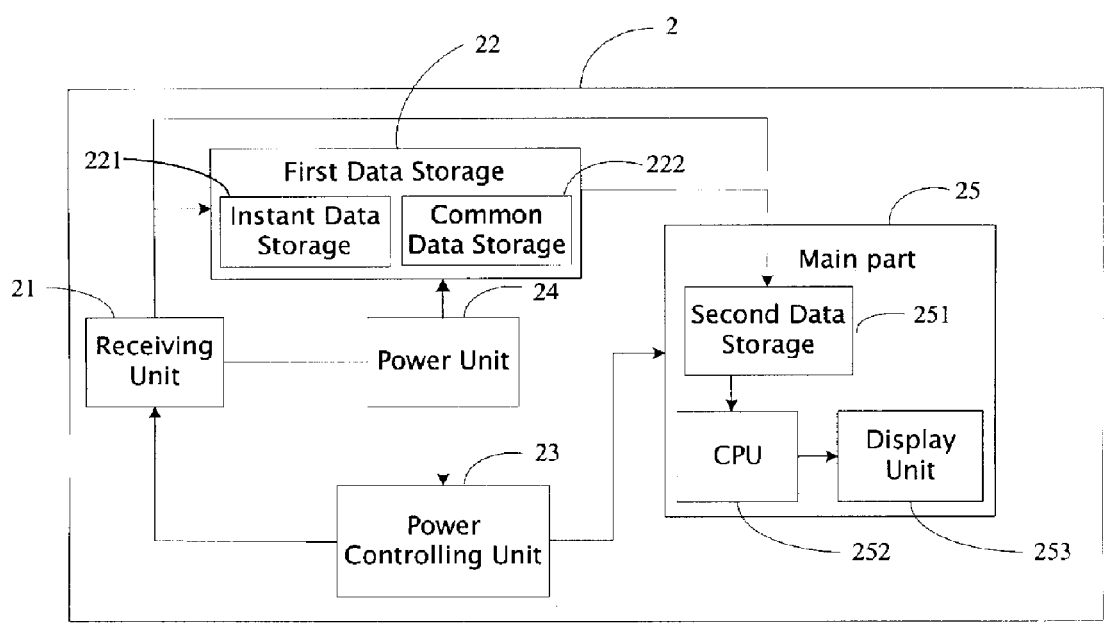
FIG. 2 is a block diagram of a portable electronic apparatus 2 of the system of FIG. 1.

FIG. 2 is a block diagram of the portable electronic apparatus 2. The portable electronic apparatus 2 includes a receiving unit 21, a first data storage 22, a power controlling unit 23, a power unit 24, and a main part 25.

The receiving unit 21 is electrically connected to the first data storage 22, the power controlling unit 23, the power unit 24, and the main part 25 and it is configured for receiving the compressed electronic file transferred from the data sending electronic device 1. The main part 25 is electrically connected to the first data storage 22, the power control unit 23, and the receiving unit 21. The main part 25 includes a second data storage 251, a central processing unit (CPU) 252, and a display unit 253, and is configured for decompressing the compressed electronic file back to the electronic file and for displaying the electronic file to the recipients. The power unit 24 is electrically connected to the receiving unit 21, the first data storage 22 and the power controlling unit 23 and keeps supplying power to them even when the recipient turn off the portable electronic apparatus 2. Actually the receiving unit 21 also supplies power to the main part 25 via the power control unit 23. However, the power unit 24 does not necessarily supply power to the main part 25 all the time, especially when the recipient turns off the portable electronic apparatus 2, the main part 25 is in the "power-off" state. The power controlling unit 23 is interposed between the power unit 24 and the main part 25, and is used for controlling power supply to the main part 25 in accordance with control signals from the receiving unit 21. In the preferred embodiment, the power controlling unit 23 detects whether the main part 25 is in a "power-on" state or a "power-off" state and informs the receiving unit 21 the power on/off state of the main part 25. When the compressed electronic file is received, the receiving unit 21 determines by the identification code contained in the compressed electronic file whether the electronic file is an instant file or a common file and further determines whether the main part 25 is in the "power-on" state or the "power-off" state via the help of the power controlling unit 23. If the electronic file is an instant file while the main part 25 is in the "power-off" state, the receiving unit 21 produces a control signal to the power controlling unit 23. The power controlling unit 23 then supplies power to the main part 25 in accordance with the control signal from the receiving unit 21, thereby enabling the main part 25 to display the electronic file. If the electronic file is an instant file and the main part 25 is in the "power-on" state, the receiving unit 21 sends the compressed electronic file to the main part 25 directly. The main part 25 then displays the electronic file to the recipient.

The receiving unit 21 and the first data storage 22 are configured to receive power directly from the power unit 24 without interrupt, thus to receive and store the compressed electronic file from the data sending electronic device 1 in a timely fashion. In other words, the receiving unit 21 and the first data storage 22 are in a normally "power-on" state. The first data storage 22 is configured for storing any incoming compressed electronic file when the portable electronic apparatus 2 is turned off. The first data storage 22 includes an instant data storage 221 for storing instant electronic files when the main part 25 is in a power-off state. More specifically, the first data storage 22 stores an incoming electronic file that has been determined by the receiving unit 21 as an instant file when the main part 25 is detected as being in a "power-off" state. The first data storage 22 further includes a common data storage 222 for storing common electronic files when the main part 25 is in a power-off state. More specifically, the common data storage 222 stores an incoming electronic file that has been determined by the receiving unit 21 as a common file if the main part 25 is detected as being in a "power-off" state.

When a compressed electronic file is received, the receiving unit 21 first determines according to the identification code of the compressed electronic file that the compressed electronic file is an instant file or a common file, and then determines via the help of the power controlling unit 23 that the main part 25 is in the "power-on" state or in the "power-off" state.

Figure 3:
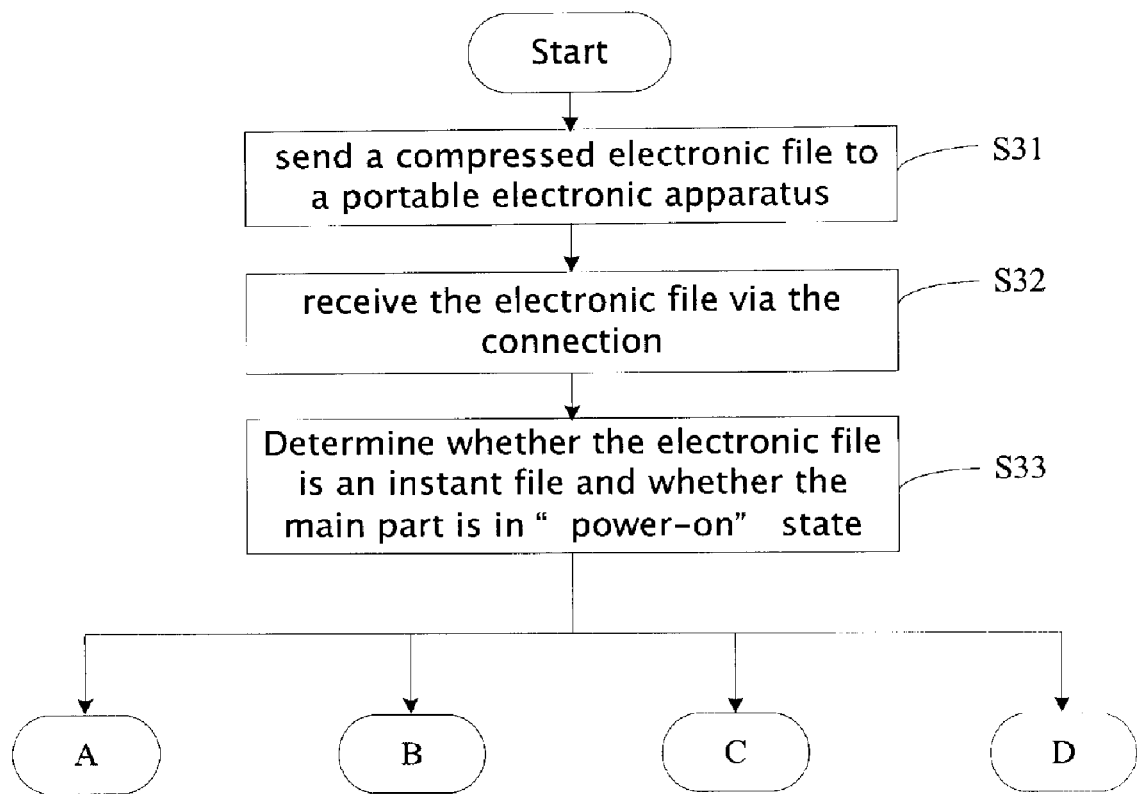
FIG. 3 is a flow chart of a preferred method for timely receiving and displaying an electronic file on the portable electronic apparatus of FIG. 2, the method being divided into four branches after a determining step thereof is executed.

FIG. 3 is a flow chart of a preferred method for receiving and displaying the electronic file on the portable electronic apparatus 2. In step S31, the data sending electronic device 1 compresses the electronic file and sends the compressed electronic file to the portable electronic apparatus 2. In step S32, the receiving unit 21 receives the compressed electronic file via the connection 3. In step S33, the receiving unit 21 determines according to the identification code of the electronic files whether the electronic file is either an instant file or a common file, and determines via the help of the power controlling unit 23 whether the main part 25 is in the "power-on" state or in the "power-off" state. If the electronic file is an instant file and the main part 25 is in the "power-on" state, the portable electronic apparatus 2 executes procedure A relating to FIG. 4. If the electronic file is an instant file and the main part 25 is in the "power-off" state, the portable electronic apparatus 2 executes procedure B relating to FIG. 5. If the electronic file is a common file and the main part 25 is in the "power-on" state, the portable electronic apparatus 2 executes procedure C relating to FIG. 6. If the electronic file is a common file and the main part 25 is in the "power-off" state, the portable electronic apparatus 2 executes procedure D relating to FIG. 7.

Figure 4:
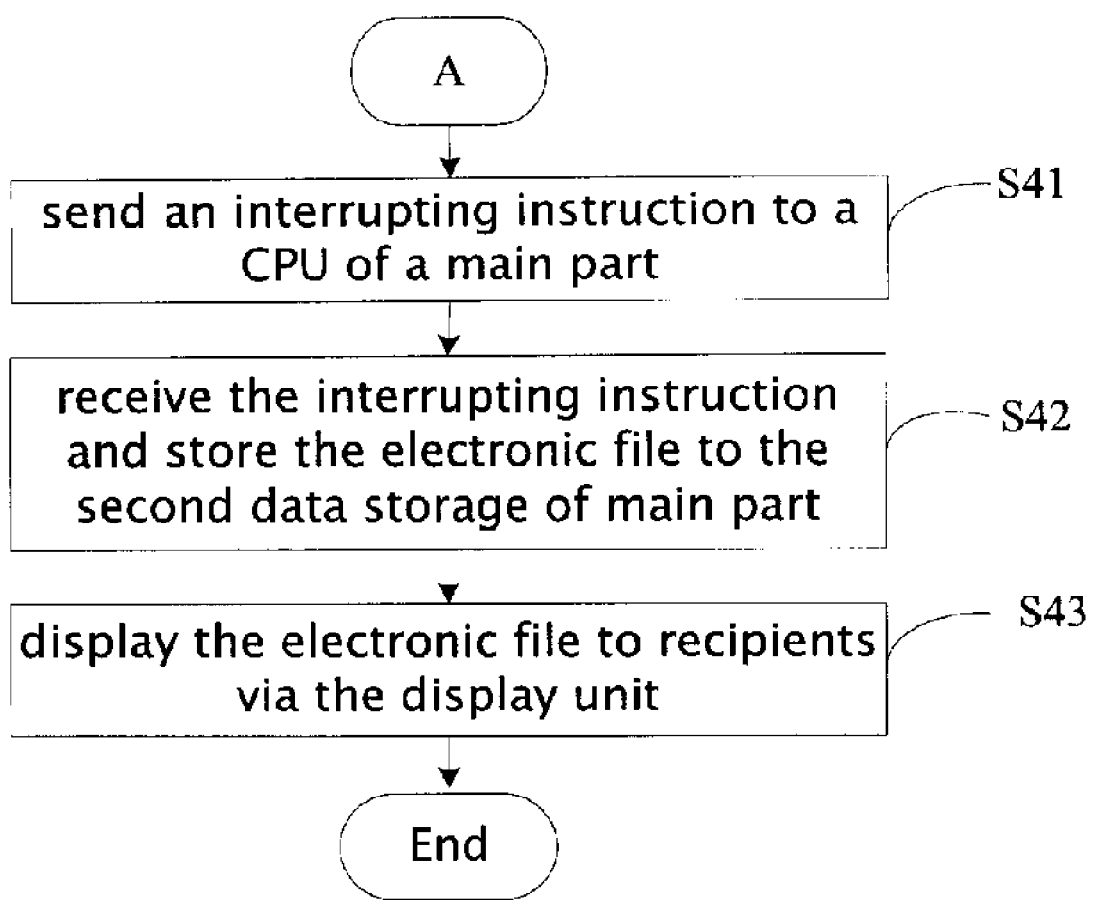
FIG. 4 is a flow chart of a first branch of FIG. 3.

FIG. 4 is a flow chart of procedure A. In step S41, the receiving unit 21 sends an interrupt instruction to the CPU 252 of the main part 25. In step S42, the CPU 252 receives the interrupt instruction, and stores the compressed electronic file directly to the second data storage 251 of main part 25 according to the interrupt instruction. In step S43, the CPU 252 obtains the compressed electronic file from the second data storage 251, decompresses the compressed electronic file, and displays the electronic file to the recipients via the display unit 253.

Figure 5:
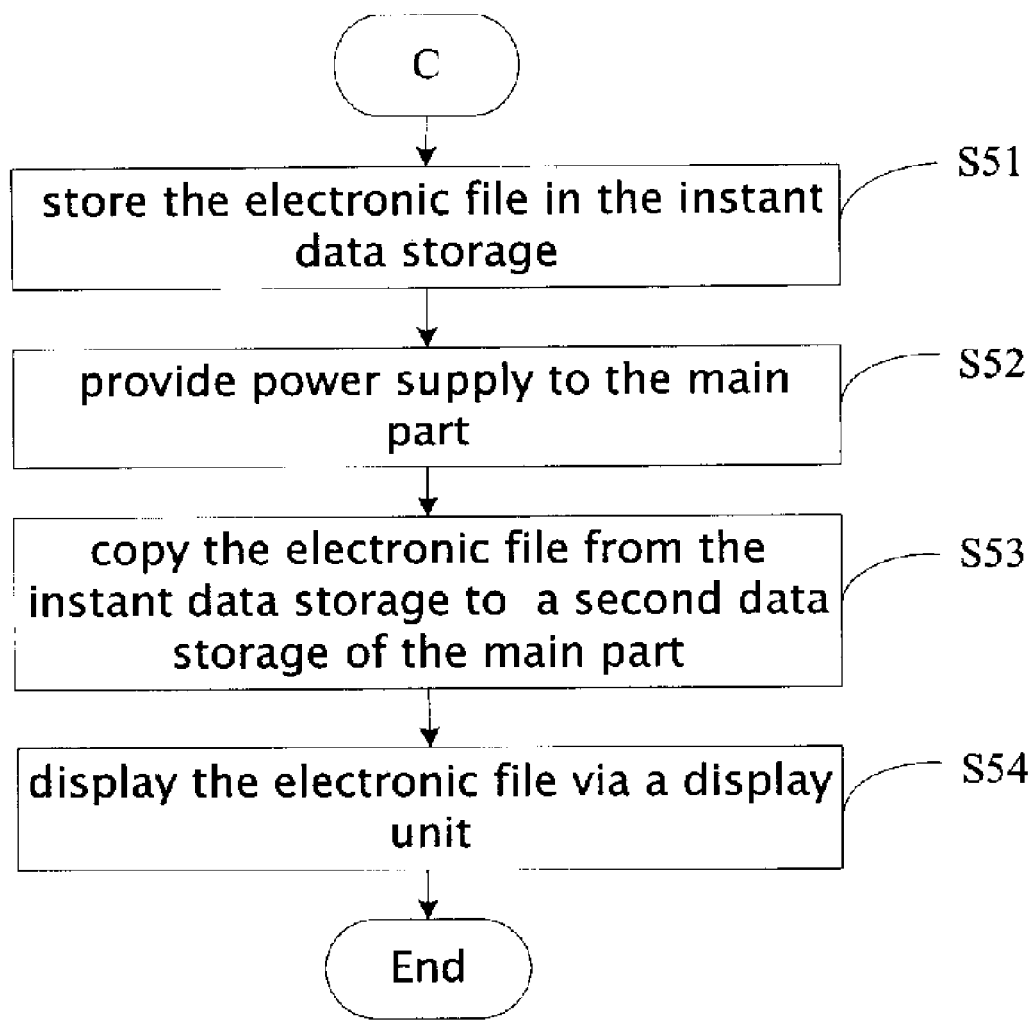
FIG. 5 is a flow chart of a second branch of FIG. 3.

FIG. 5 is a flow chart of procedure B. In step S51, the receiving unit 21 stores the electronic file compressed in the instant data storage 221. In step S52, the receiving unit 21 sends the control signal to the power controlling unit 23 and the power controlling unit 23 supplies power to the main part 25 according to the control signals, and the main part 25 is therefore turned to be in the "power-on" state. In step S53, the CPU 252 of the main part 25 obtains the electronic file compressed from the instant data storage 221, and copies the electronic file compressed to the second data storage 251 of the main part 25. In step S54, the CPU 252 decompresses the electronic file compressed, and displays the electronic file on the display unit 253 of the main part 25.

Figure 6:
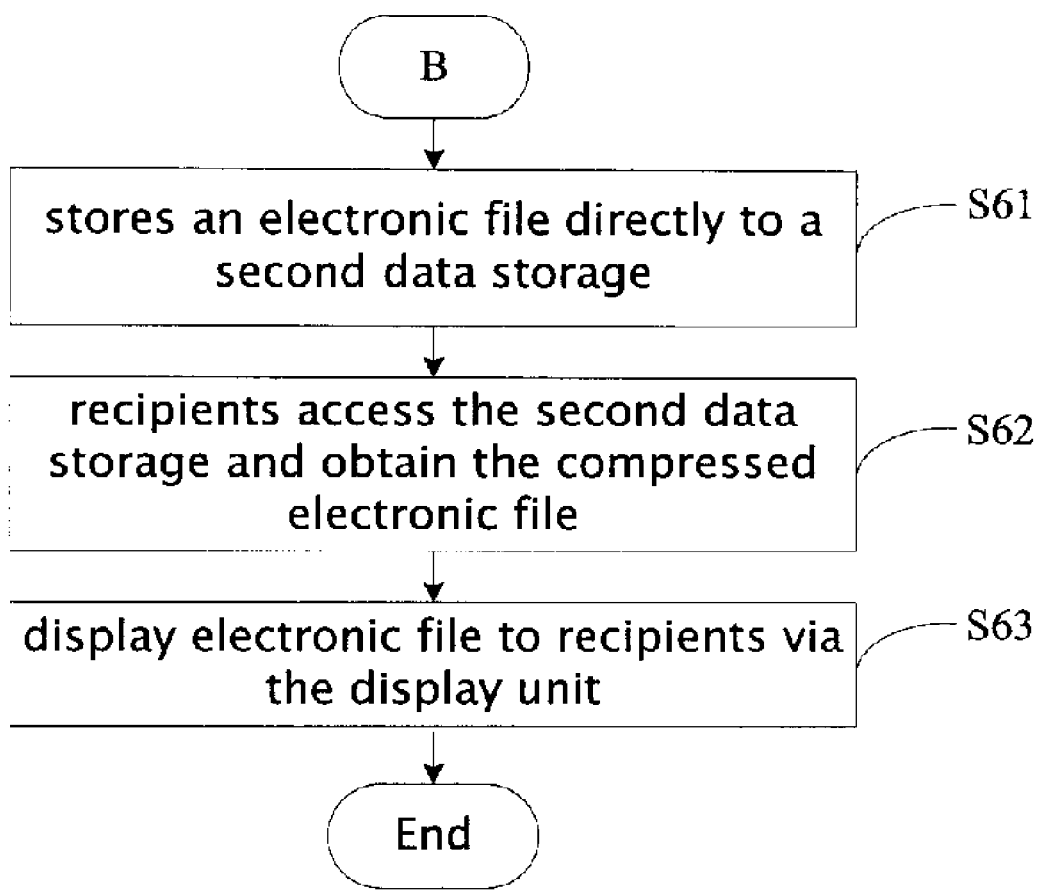
FIG. 6 is a flow chart of a third branch of FIG. 3.

FIG. 6 is a flow chart of procedure C. In step S61, the receiving unit 21 stores the electronic file compressed directly in the second data storage 251. In step S62, the second data storage 251 is accessed and the electronic file compressed is obtained. In step S63, the CPU 252 decompresses the electronic file compressed and displays the electronic file to the recipients via the display unit 253.

Figure 7:
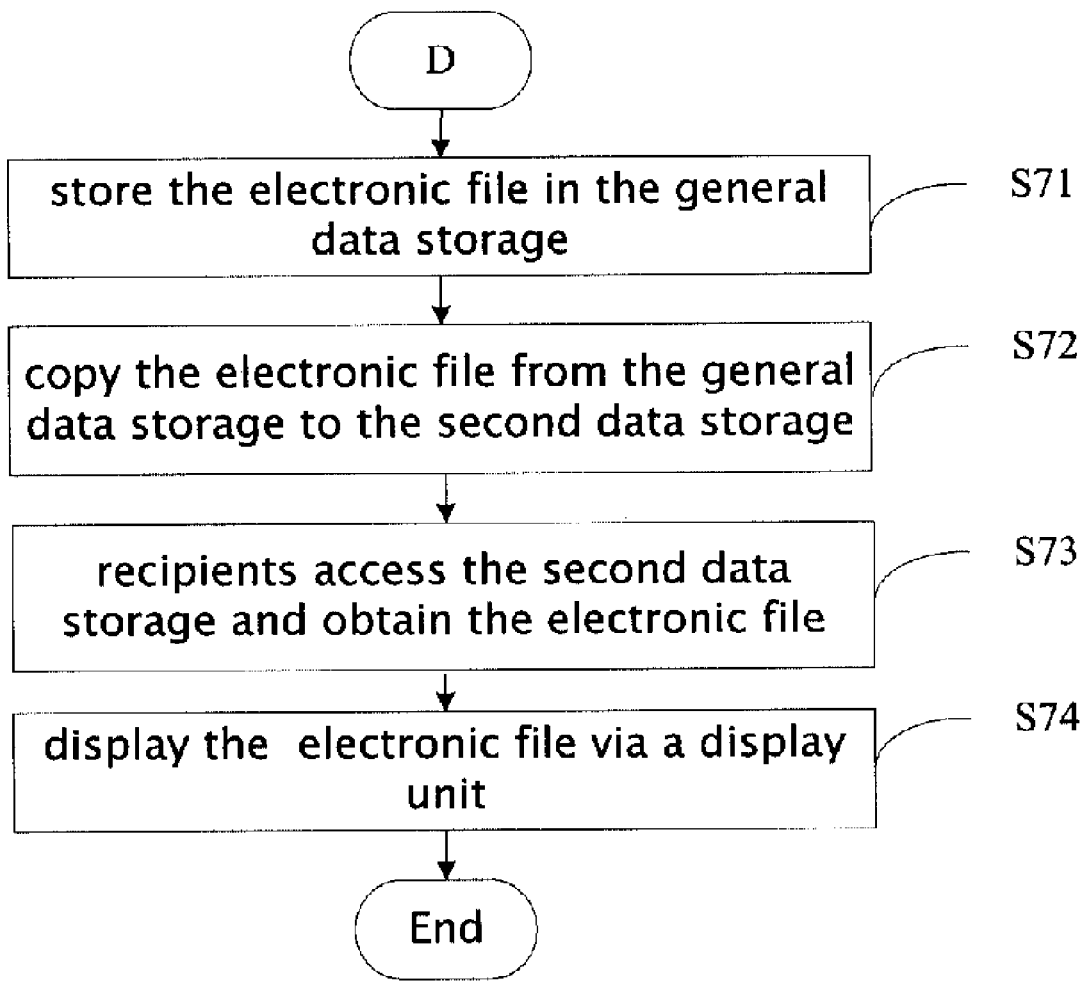
FIG. 7 is a flow chart of a fourth branch of FIG. 3.

FIG. 7 is a flow chart of procedure D. In step S71, the receiving unit 21 stores the compressed electronic file in the common data storage 222. The status may maintain in step S71 until sometime the recipient turns on the main part 25. In step S72, after the main part 25 enters into the "power-on" state, the CPU 252 copies the electronic file compressed from the common data storage 222 to the second data storage 251. In step S73, the second data storage 251 is accessed and the electronic file compressed is obtained. In step S74, the CPU 252 decompresses the electronic file compressed and displays the electronic file on the display unit 253 if the recipient accesses the electronic file.

Although the present invention has been specifically described on the basis of a preferred embodiment, the invention is not to be construed as being limited thereto. Various changes or modifications may be made to the embodiment without departing from the scope and spirit of the invention.

What is claimed is:

1. A system for receiving and displaying electronic files, comprising:
   a data sending electronic device for sending an electronic file with an identification code, the identification code indicating the electronic file is an instant file or a common file; and
   at least one portable electronic apparatus being connected to the data sending electronic device via at least one connection, the at least one portable electronic apparatus comprising:
   a main part configured for displaying the electronic file, the main part originally staying in either a "power-on" state or a "power-off" state; and a receiving unit, which is in a normally "power-on" state, configured for receiving the electronic file, determining according to the identification code whether the electronic file is an instant file;
   a power controlling unit electrically connected between the receiving unit and the main part;
   wherein the receiving unit is further configured for determining whether the main part is in the "power-on" state; and sending an interrupt instruction to the main part to interrupt the other currently running programs and display the electronic file if the electronic file is an instant file and the main part is in the "power-on" state; and if the electronic file is a common file and the main part of the portable electronic apparatus is in the "power-on" state, the receiving unit stores the electronic file directly to the main part and the main part displays the electronic file when the electronic file is accessed by a corresponding recipient who holds the portable electronic apparatus.

2. The system as described in claim 1, wherein the at least one connection is a wired connection or a wireless connection or any combination of networks.

3. A portable electronic apparatus for receiving and displaying an electronic file with an identification code, the identification code indicating whether the electronic file is an instant file or a common file, the portable electronic apparatus comprising:
   a main part configured for displaying the electronic file;
   a receiving unit which is in a normally "power-on" state, configured for receiving the electronic file with the identification code, and configured for determining according to the identification code whether the electronic file is an instant file or a common file; and
   a power controlling unit electrically connected between the receiving unit and the main part;
   wherein the receiving unit is further configured for determining whether the main part is in a "power-on" state or in a "power-off" state through the power controlling unit and sending an interrupt instruction to the main part to interrupt other currently running programs and display the electronic file if the receiving unit determines the electronic file is an instant file and the main part is in a "power-on" state; and if the electronic file is a common file and the main part of the portable electronic apparatus is in the "power-on" state, the receiving unit stores the electronic file directly to the main part and the main part displays the electronic file when the electronic file is accessed by a corresponding recipient who holds the portable electronic apparatus.

4. The portable electronic apparatus as described in claim 3, wherein, the main part further comprises a data storage for storing the electronic file.

5. A method for receiving and displaying electronic files, comprising:
   providing a portable electronic apparatus electrically connected to a data sending electronic device, the portable electronic apparatus comprising a receiving unit and a main part, and the main part being selective in a "power-on" state or a "power-off" state;
   receiving an electronic file with an identification code which indicates whether the electronic file is an instant file or a common file from the data sending electronic device;
   determining whether the electronic file is an instant file or a common file according to the identification code and whether the main part is in the "power-on" state or in the "power-off" state; and
   executing the following steps if the electronic file is an instant file and the main part is in the "power-on" state:
   sending an interrupt instruction to the main part;
   receiving the interrupt instruction with the main part; and
   interrupting other currently running programs and displaying the electronic file with the main part according to the interrupt instruction; and
   if the electronic file is a common file and the main part of the portable electronic apparatus is detected to be in a "power-on" state:
   storing the electronic file directly to the main part, and
   displaying the electronic file with the main part if the electronic file is accessed by a corresponding recipient.

\* \* \* \* \*